United States Patent [19]

Martin

[11] Patent Number: 5,551,038
[45] Date of Patent: Aug. 27, 1996

[54] DIRECTORY BASED COMPUTER ENVIRONMENT

[75] Inventor: Andrew R. Martin, Austin, Tex.

[73] Assignee: International Business Machines Corporation, Armonk, N.Y.

[21] Appl. No.: 914,075

[22] Filed: Jul. 16, 1992

[51] Int. Cl.⁶ ............................................. G06F 15/20
[52] U.S. Cl. .................... 395/700; 395/155; 364/DIG. 2; 364/920.2; 364/976; 364/949.4; 364/963; 364/975.2
[58] Field of Search ............... 364/DIG. 2; 395/700, 395/650

[56] References Cited

U.S. PATENT DOCUMENTS

| | | | |
|---|---|---|---|
| 4,068,304 | 1/1978 | Beausoleil et al. | 364/200 |
| 4,087,794 | 5/1978 | Beausoleil et al. | 364/900 |
| 4,635,208 | 1/1987 | Coleby et al. | 364/491 |
| 4,686,522 | 8/1987 | Hernandez et al. | 340/709 |
| 4,815,029 | 3/1989 | Barker et al. | 364/900 |
| 4,821,211 | 4/1989 | Torres | 364/521 |
| 4,843,538 | 6/1989 | Lane et al. | 364/188 |
| 4,853,843 | 8/1989 | Ecklund | 364/200 |
| 4,858,114 | 8/1989 | Heath et al. | 364/200 |
| 4,868,766 | 9/1989 | Oosterholt | 364/522 |
| 4,873,623 | 10/1989 | Lane et al. | 364/188 |
| 4,885,717 | 12/1989 | Beck et al. | 364/900 |
| 4,899,136 | 2/1990 | Beard et al. | 340/706 |
| 4,933,514 | 6/1990 | Bowers | 178/18 |
| 4,939,507 | 7/1990 | Beard et al. | 340/706 |
| 4,945,475 | 7/1990 | Bruffey et al. | 364/200 |
| 4,951,190 | 8/1990 | Lane et al. | 364/188 |
| 4,953,080 | 8/1990 | Dysart et al. | 364/200 |
| 4,984,152 | 1/1991 | Muller | 364/200 |
| 4,989,132 | 1/1991 | Mellender et al. | 364/200 |
| 4,996,654 | 2/1991 | Rosenow | 364/521 |
| 5,001,697 | 3/1991 | Torres | 364/521 |
| 5,006,992 | 4/1991 | Skeirik | 364/513 |
| 5,040,131 | 8/1991 | Torres | 364/521 |
| 5,041,967 | 8/1991 | Ephrath et al. | 364/200 |
| 5,041,982 | 8/1991 | Rathnam | 364/443 |

OTHER PUBLICATIONS

IBM Technical Disclosure Bulletin, Interactive Shema Diagram to Visually Represent Tables of Related Data and Meaningful Joins Between Tables, vol. 33, No. 9, Feb. 1991, pp. 243–246.

Microsoft; *Microsoft MS–DOS User's Guide and Reference*; Microsoft Press; 1991, pp. 72–74, 94–95, 245–272, 379, 559–561.

Employees of Microsoft Corp.; *Microsoft Windows 3.1 User's Guide, Gateway 2000 Edition*; publisher unknown, 1990–1992.

*Primary Examiner*—Gareth D. Shaw
*Assistant Examiner*—Jonathan H. Backenstose
*Attorney, Agent, or Firm*—Keith L. Stephens; Diana L. Roberts

[57] ABSTRACT

The present invention is a method, system and process for automatically customizing a computer environment based on the current active computer disk directory. Detection of the current active disk directory and any change of disk directory by a user triggers a search for a file that initiates the computer environment. Upon detection of the file, the system reconfigures the operating system to meet the user's requirements based on the disk directory.

10 Claims, 3 Drawing Sheets

```
alias cd * \
    if (-e .exit.csh) source .exit.csh: \
    chdir \!*; \
    if (-e .entry.csh) source .entry.csh
```

FIG. 3

```
alias cd=_cd
function _cd
{
    [ [ -r .exit.ksh] ] && .exit.ksh
    'cd' $1
    [ [ -r .entry.ksh ] ] && .entry.ksh
}
```

FIG. 4

DIRECTORY BASED COMPUTER ENVIRONMENT

FIELD OF THE INVENTION

This invention generally relates to improvements in an operating system and more particularly to preparing a specific operating system environment for a user based on the current directory that is active.

BACKGROUND OF THE INVENTION

Popular operating systems such as the Disk Operating System (DOS) and Unix currently allow a user to customize their environment based on their particular requirements. This concept was originally introduced by IBM by allowing a user to have a unique ID used to access the system. The ID was accessed via a logon procedure and resulted in increased security and a customized environment based on their preferences. However, this processing only occurred once when a user logged on to the system.

Unix and DOS provide similar capability. In DOS and UNIX the initialization of the system occurs once when a user first accesses the system. If a user changes to another directory, no change in the environment occurs in.

Examples of another user environment system for a program is found in US Pat. No. 4,858,114 which discloses an emulation system for automatically modifying I/O translation tables in programs designed to run on different computers. The technique disclosed in the '114 patent is another example of environment settings being prepared ahead of time for use when a program is first executed with no capability to alter the settings after the preliminary invocation.

U.S. Pat. No. 5,006,992 discloses a process control system with reconfigurable expert rules. The rules control the execution of various processes in the plant environment. However, the rules do not automatically vary. A supervisor must manually vary the rules based on the needs of the particular process and the supervisors knowledge of the environment.

The applicant is unaware of any teaching in the prior art that automatically customizes a system environment for a user based on the entry and exit of a current active computer disk directory.

SUMMARY OF THE INVENTION

Accordingly, it is a primary objective of the present invention to automatically customize the system environment of a computer based on the entry and exit of a current active computer disk directory.

These and other objectives of the present invention are accomplished by the operation of a process in the memory of a processor that provides for the detection of the current active disk directory and any change of disk directory by a user. Upon detection of a new disk directory for a particular user, the system reconfigures the operating system to meet the user's requirements based on the disk directory.

BRIEF DESCRIPTION OF THE DRAWINGS

FIG. 3 illustrates a command string for a search in the AIX C-shell.

FIG. 4 illustrates a command string for a search in the AIX korn-shell.

DETAILED DESCRIPTION OF THE INVENTION

Figure 1:
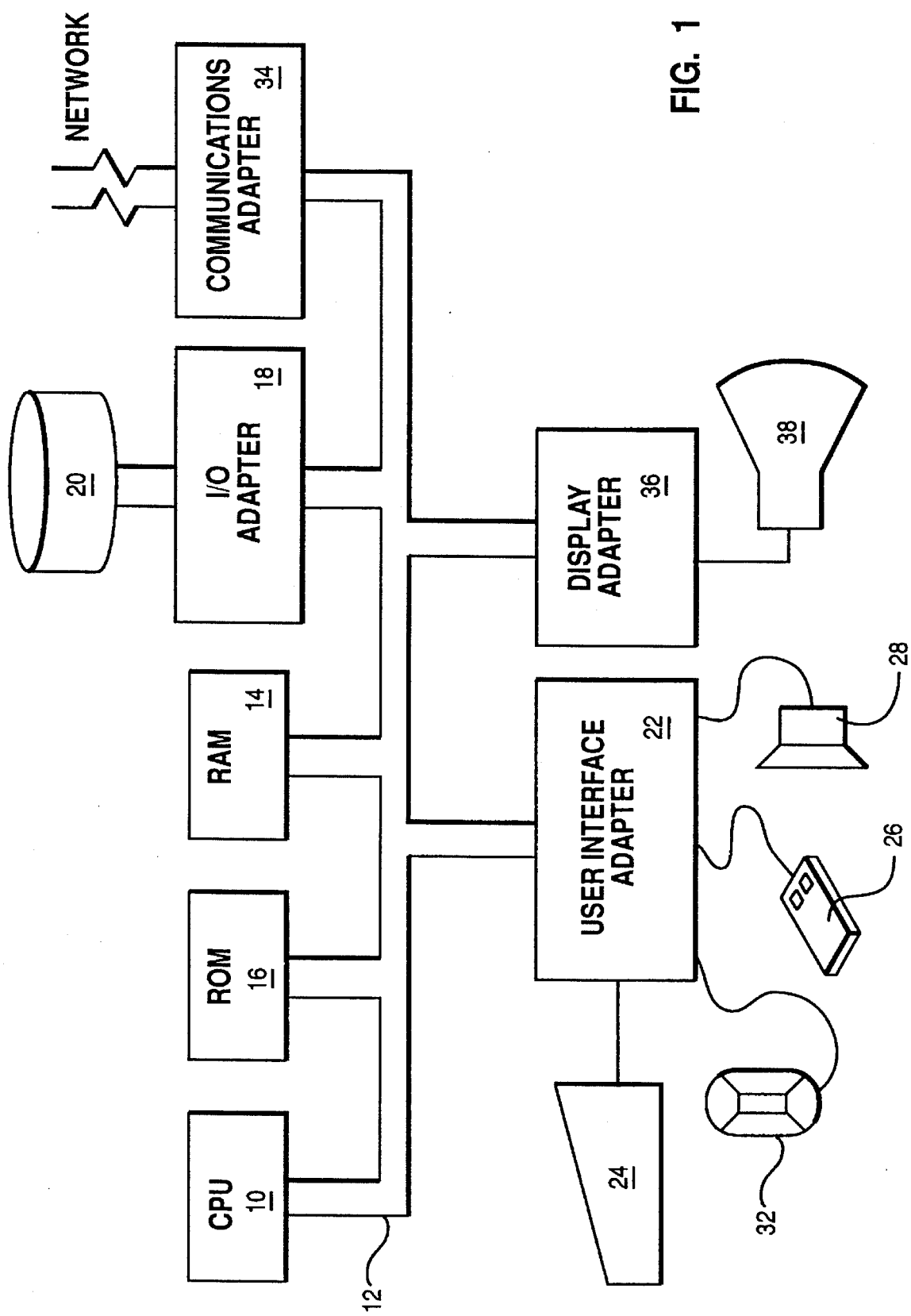
FIG. 1 is a block diagram of a personal computer system in accordance with the subject invention.

The invention is preferably practiced in the context of an operating system resident on an IBM RISC SYSTEM/6000 computer available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the AIX operating system and the computer software making up this invention which is included as a toolkit.

AIX Operating System

IBM AIX VERSION 3.2.1 FOR RISC SYSTEM/ 6000 AND AIXWINDOWS ENVIRONMENT/6000 are the operating system and windowing environment that the subject invention was implemented in. AIX Version 3.2.1 for RISC System/6000 consists of some selective enhancements to AIX which is a production UNIX environment that IBM markets. Detailed descriptions of the logic and functional characteristics of the operating system and the RISC SYSTEM/6000 are available in the following publications:

AIX Version 3.2 for RISC System/6000 Installation Guide (SC23-2341).

The AIXwindows Desktop Enhancement (GC23-2442)

AIXwindows Environment/6000 Version 1.2.1 (5601-257)

AIX Commands Reference for RISC System/6000, Vol 1 (GC23-2376-1)

AIX Commands Reference for RISC System/6000, Vol 2 (GC23-2366-1)

AIX Commands Reference for RISC System/6000, Vol 3 (GC23-2367-1)

AIX Commands Reference for RISC System/6000, Vol 4 (GC23-2393-0)

AIX Calls and Subroutines Reference for RISC System/ 6000 (SC23-2198-0)

General Programming Concepts for RISC System/6000 (SC23-2205-1)

Computer Environment Customization

The invention is based on a computer based windows environment with multiple windows representing separate terminal sessions with the AIX Workstation. Each of these terminal sessions maintains its own environment.

An environment consists of various variables and aliases, a particular user name, and a current directory location. As we perform various commands in each of these sessions their environments may change if we explicitly request them, otherwise they do not.

In AIX, there are many ways to customize a user's environment. The C-Shell (CSH) command processor provides files to customize the user's environment: when you logon onto, create a sub-shell, and logoff of an AIX computer. When you logon using CSH the file .login is executed, when you create a sub-shell the file .cshrc is executed, and when you logoff the file .logout is executed.

The Korn-Shell (KSH) command processor provides files to customize a user's environment. When you logon using KSH the file .profile is executed, when you create a sub-shell the file .kshrc is executed.

One graphical user interface for AIX is called AIX-WINDOWS. AIX-WINDOWS provides a way to customize the position and type of applications to create when you initiate it. Initiation is commenced by invoking the file .xinitrc that is executed when you start-up the AIX-Windows Graphical User Interface.

Another file, .Xdefaults provides specific attributes and default values for many AIX-Windows applications.

The mail tool MAIL, for reading and sending mail, provides a file .mailrc that allows you to set-up distribution lists and specific options every time you run the mail command.

Similarly, in the DOS operating system, the files config.sys and autoexec.bat are used to initialize the environment at system startup.

in the OS/2 operating system, the files config.sys and startup.cmd are used to initialize the environment at system startup.

FLOW CHART

Figure 2:
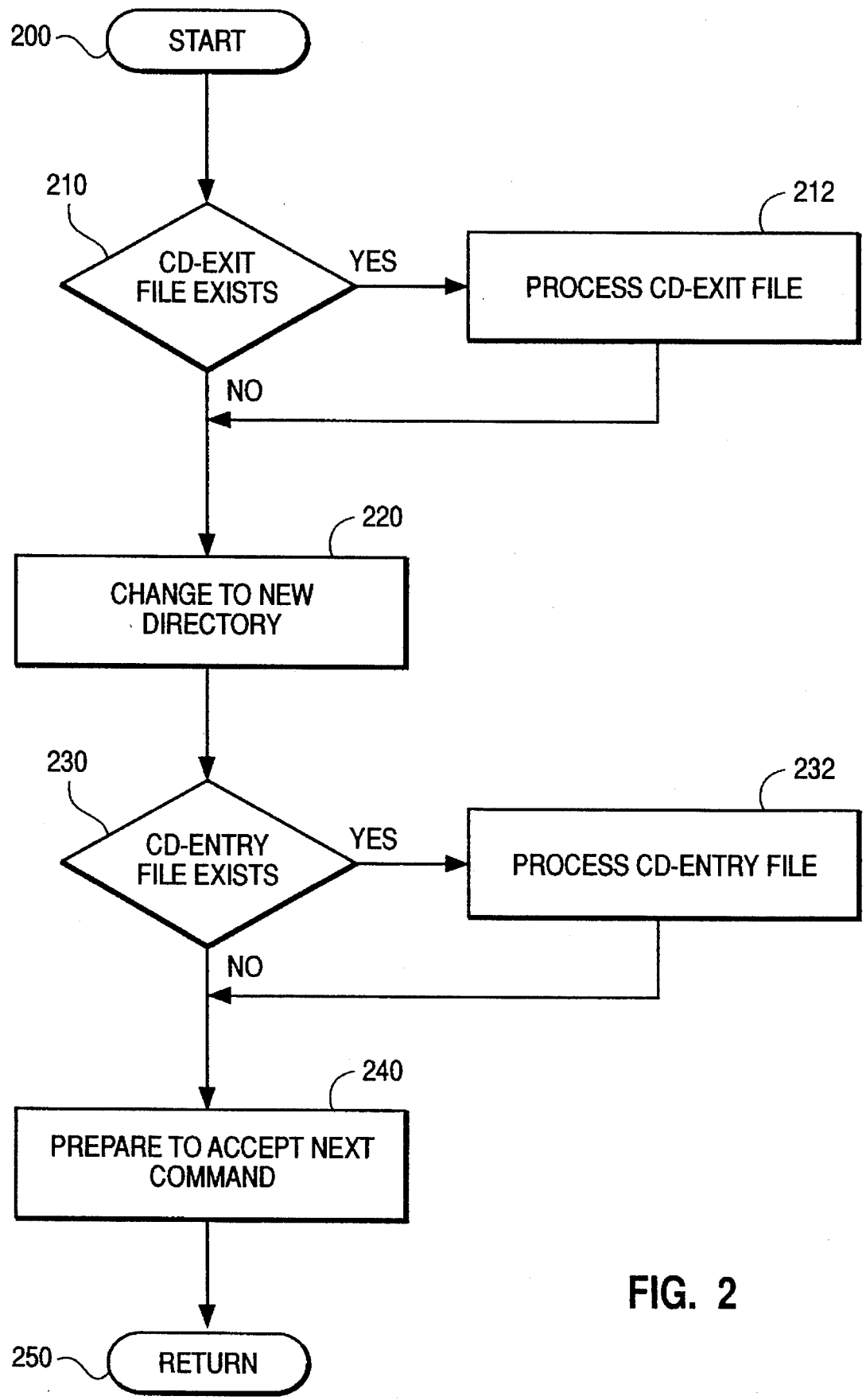
FIG. 2 is a flowchart depicting the detailed logic in accordance with the subject invention.

FIG. 2 is a flowchart of the detailed logic in accordance with the subject invention. Processing commences at terminal 200 where control immediately passes to a test at decision block 210 to determine if a change directory on exit (CD-exit) file exists. If a file is detected, then the file is processed to initialize the computer environment as shown in function block 212 and control passes to function block 220. If no CD-exit file exists, then control immediately flows to function block 220 to change to the new directory.

Then, at decision block 230, another test is performed to determine if a change directory on entry (CD-entry) file exists. If a file is detected, then the file is processed to initialize the computer environment as shown in function block 232 and control passes to function block 240. If no CD-entry file exists, then control immediately flows to function block 240 to prepare to accept the next user command. Finally, control passes to the calling program at terminal 250.

The invention augments the change directory (CD) command with a file search for an entry or exit profile file when a user executes the CD command. In the preferred embodiment, the files are labeled .entry.csh and .exit.csh. FIG. 3 illustrates a command string for a search in the AIX X-shell. Similarly, FIG. 4 illustrates a command string for a search in the AIX Korn-shell.

In the AIX Korn-shell the check is implemented by:

```
alias cd=_cd
function _cd
{
    [[-r .exit.ksh]]&& .exit.ksh
    'cd' $1
    [[-r .entry.ksh]]&& .entry.ksh
}
```

Under DOS or OS/2, the following code can be used to implement the invention.

```
#include <stdio.h>
#include <io.h>
#define R_ACC 04
void main(int argc, char *argv[ ])
{
    char *cd_exit = "exit.bat";
    char *cd_entry = "entry.bat";
    if (access (cd_exit, R_ACC) == 0)
        system (cd_exit);
    if (chdir(argv[1]) == -1)
        perror ("chdir"), exit(-1);
    if (access (cd_entry, R_ACC) == 0)
        system (cd_entry);
}
```

Once the file is detected using any of the above methods, the file is passed to the command line interpreter or batch processor to initiate the appropriate environment for the user. There are numerous alternatives to customize an environment each time a user executes the CD command. For example, using standard operating system commands, the user may incorporate security, color defaults, or default mail options into a particular environment.

Example CD-Entry File In Accordance With the Invention

A single CD-Entry file is unlikely to contain all of the statements listed below. However, the file below gives a representation of the sort of commands you could put in the file.

```
entry.csh:
echo "Warning you are in the ROOT directory."

#   Inform user that they are in a special
'#  directory. This directory is not
#   usually accessed by general users.

        setenv X "*.c *.h main.C"

#   Set Variable X to all of the C source and
#   Header files.
#   This can be used to easily list, print,
#   edit, etc all of the pertinent source files
#   in this directory.

        alias edit "/bin/edit +se tabstop=32"

#   Sets up an alias for the editor so that it
#   uses tab stops at every 32 spaces rather
#   than the default, because a
#   file in the directory requires it.

        alias compile "cc -I/local/include a.c \
        b.c.c \

        main.c -o main -lbsd -1X11"

#   Set up an alias that knows how to compile
#   the specific
```

-continued

```
#    c source programs for this directory.

     setenv COLUMNS    132
     setenv LINES      64

#    Set the lines/columns to a different size.

     echo $USER enters at 'date' >
     .access.list

#    Write name of user and date of access that a
#    user CD's into a particular directory.

```

```
.exit.csh:
     rm -f junk.*

#    Remove some temporary or junk files that
#    may have been created whilst in this
#    directory

     unalias edit

#    remove an alias set-up for the edit command.

     echo $USER enters at 'date' > \
     .access.list
#    Write name of user and date of access that a
#    user CD's out of a particular directory.
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A system having at least a display and interface adapter, the system for customizing a computer environment in response to a change directory command, comprising:
   (a) a processor;
   (b) means for inputting a change directory command;
   (c) in response to the change directory command, means for detecting the current directory;
   (d) means for controlling the processor to search for an environment file on the current directory, wherein the environment file contains operating system commands; and
   (e) means for controlling the processor to execute the operating system commands stored in the environment file to reconfigure the operating system.

2. The system as recited in claim 1, wherein the operating system commands comprise means for implementing security for the computer environment.

3. The system as recited in claim 1, wherein the operating system commands comprise means for implementing color defaults on the display.

4. The system as recited in claim 1, wherein the operating system commands comprises means for implementing default mail options for the computer environment.

5. A method for customizing a computer environment in response to a change directory command, comprising the steps of:
   (a) detecting a change directory command;
   (b) in response to detecting the change directory command, detecting the current directory;
   (c) searching for an environment file on the current directory, wherein the environment file contains operating system commands; and
   (d) executing the operating system commands stored in the environment file to reconfigure the operating system.

6. A method as recited in claim 5, including the step of implementing security for the computer environment.

7. A method as recited in claim 5, including the step of implementing color defaults for the computer environment.

8. A method as recited in claim 5, including the step of implementing default mail options for the computer environment.

9. A system having at least a display and interface adapter, the system for customizing a computer environment in response to a change directory command, comprising:
   (a) a processor;
   (b) means for inputting a change directory command;
   (c) means for executing the change directory command;
   (d) means for detecting the new directory;
   (e) in response to detecting the new directory, means for controlling the processor to search for an environment file on the new directory, wherein the environment file contains operating system commands; and
   (f) means for controlling the processor to execute the operating system commands to reconfigure the operating system.

10. The method as recited in claim 5 further comprising the steps of:
   (e) executing the change directory command;
   (f) detecting the new directory according to the change directory command;
   (g) searching for a second environment file on the new directory, wherein the second environment file contains operating system commands; and
   (h) executing the operating commands stored in the second environment file to reconfigure the operating system.

* * * * *